Dec. 31, 1940.    B. BERGHAUS ET AL    2,227,176
METHOD OF SINTERING HARD SUBSTANCES IN VACUUM
Filed July 14, 1938
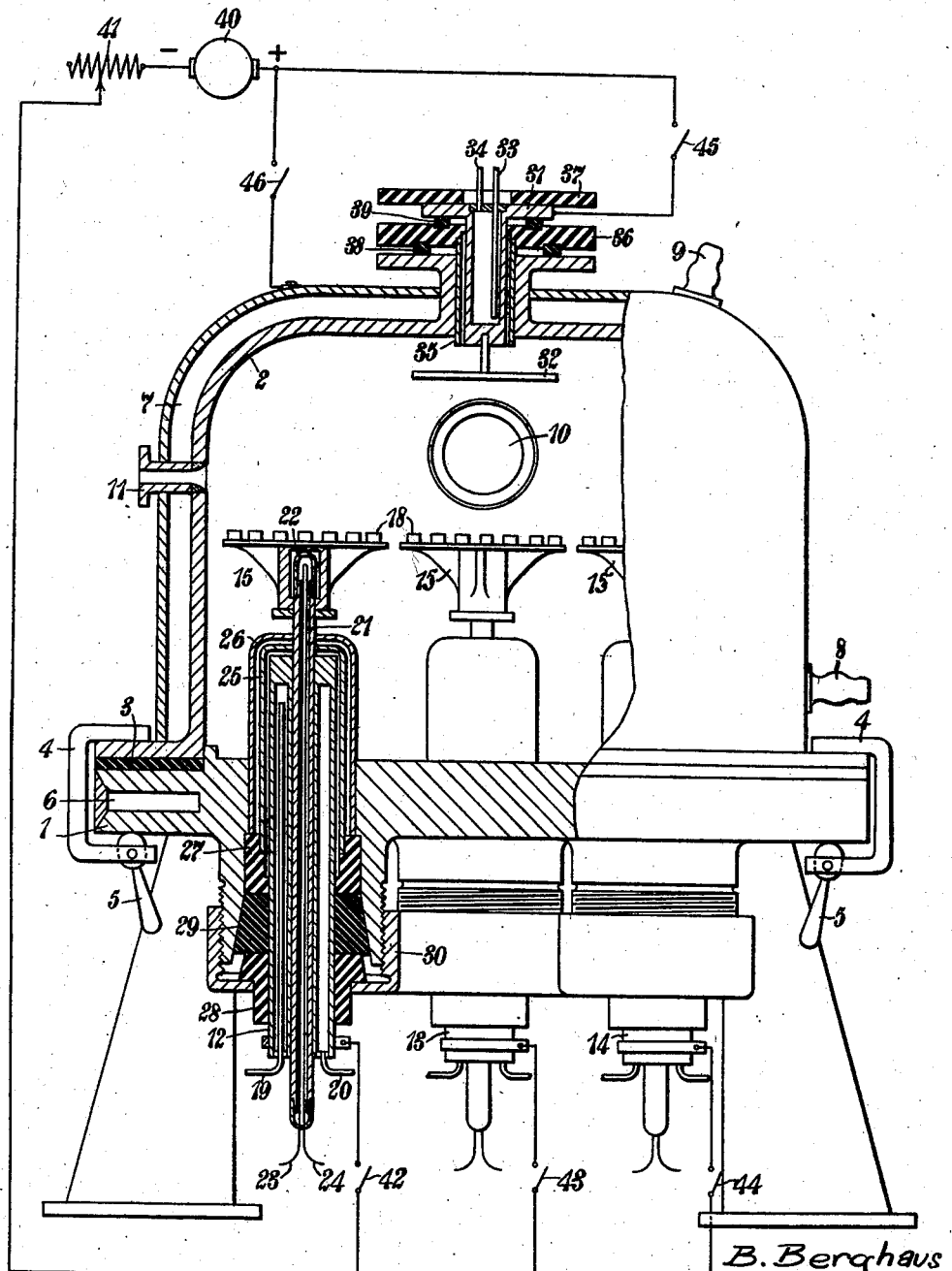
B. Berghaus
W. Burkhardt
Inventors
By: Glascock Downing & Seebold
Attys.

Patented Dec. 31, 1940

2,227,176

UNITED STATES PATENT OFFICE 2,227,176

METHOD OF SINTERING HARD SUBSTANCES IN VACUUM

Bernhard Berghaus, Berlin-Lankwitz, and Wilhelm Burkhardt, Berlin-Grunewald, Germany; said Burkhardt assignor to said Berghaus Application July 14, 1938, Serial No. 219,295
In Germany August 26, 1937

5 Claims. (Cl. 75—22)

This invention relates to a method of manufacturing metallic bodies from metal powders, more particularly from hard substances, wherein the pressed bodies are subjected in a vacuum, permanently or temporarily, to a gas discharge, preferably a glow discharge, as a cathode for the purpose of being heated.

The gas discharge is preferably effected at such reduced pressures at which the pressed bodies are preferably completely covered by the glow. The glow discharge takes place at reduced pressures of 40 down to 0.001 and preferably at 5 to 0.01 millimeters of mercury. The pressed bodies may be arranged on electrode supports, which are introduced into the vacuum vessel in a screened and insulated manner. The electrode supports may be constructed hollow and be cooled. For the reception of the pressed bodies electrode plates of high melting metals, such as chromium, tantalum, titanium, molybdenum, tungsten or the like, are arranged on the electrode supports. For the reception of the pressed bodies electrode plates of other high melting materials, such as sintered earths, for instance, beryllium oxide, aluminium oxide, zirconium oxide, thorium oxide, may be arranged on the electrode supports. In the latter case, it is necessary that the pressed bodies shall make contact with the current lead. The electrode plates of non-conducting material may be metallised or lined, preferably with metals having a high melting point.

When a direct current voltage is applied to the path of the gas discharge, the negative terminal of the source of direct current voltage is connected to the pressed bodies, and the positive terminal to the vacuum vessel or one or more anodes introduced in a screened and insulated manner.

The voltage to be applied to the path of discharge may, according to the degree of heating and of the vacuum that is adjusted, be 400 to 20,000 volts. In most cases voltages up to 6,000 volts will suffice. The power to be introduced is dependent on the size and the number of the pressed bodies which are to be heated together and the temperature to be used. In order to attain sintering temperatures up to 1,000° C., 15 watts per square centimeter of surface of the material to be treated are applied and for higher temperatures up to 2,000° C., 50 and more watts per square centimeter, may be required.

Constructional parts or cutting tools may be made by the sintering of metal powder according to the process. More particularly, constructional parts may be made of metals having a high melting point, such as chromium, titanium, tantalum, molybdenum, vanadium, tungsten, alone or in admixture with metals melting at a low temperature, such as light metals, for instance magnesium, aluminum, or heavy metals such as iron, copper, cobalt. As hard substances, more particularly for cutting tools, hard metal carbides, hard metal silicides, hard metal nitrides, hard metal borides, alone or in admixture with auxiliary metals, such as aluminum, iron, nickel, cobalt and the like, may be used. Any mixture may be used which is known per se for the manufacture of hard metal.

The articles prepared by pressing from metal powder for use as constructional parts or tools subjected in a vacuum to the sintering temperature have the following advantages:

By the evacuation of the treatment chamber, the pressed bodies are freed of gas to a large extent before the temperature acts thereon and the liberation of gas is carried up to the technically obtainable vacuum. After the voltage has been applied to the electrodes and the filling gas for the discharge has been introduced, which may have a reducing, carbonising, nitrifying or indifferent action, the pressed body is heated to the desired temperature, slowly or quickly according to the material. In some cases it has been found advantageous to maintain definite temperatures for a certain period and then heat the article or articles further.

By the heating of the pressed bodies according to the invention the temperatures required for the sintering may be supplied up to 2,000° C., or more with great economy and good efficiency. The pressed bodies are sintered without the formation of any cracks while retaining the original shape. In order to produce porous bodies, such as for instance bearing brasses, the constituent part melting at a low temperature can be easily removed by gasification, without in any way affecting the shape and the resistance of the article.

Apparatus for carrying out the sintering process is illustrated in the annexed drawing wherein a glow current oven is shown in section and partly in elevation.

The glow current sintering over comprises a lower part 1 and an upper part 2, which parts are closed in a vacuum-tight manner by means of seals 3 and clamps 4 and by tightening the eccentric locking means 5. The cooling channel 6, through which flows a cooling means, serves to cool the seal 3. The upper part 2 is provided with a cooling jacket 7 to which a cooling means, for instance water, is supplied through the pipe connection 8 and the cooling medium is discharged through the pipe 9. The vacuum pump is connected to the pipe connection 10, and when required, a gas or vapour, for instance argon, a hydrocarbon, hydrogen, nitrogen, ammonia or the like, is supplied through the pipe 11 in a regulated amount, while the adjusted reduced pressure is maintained.

Three lead-in conductors 12, 13, 14 are arranged in the lower part 1, each one of which carries at the upper end a plate 15, on which the articles 18 to be sintered rest. Each lead-in conductor is made hollow and may be cooled. A cooling means, for instance water or oil, may be supplied through the pipe 19 and be discharged through the connecting pipe 20. A thermo element 21 extends into the plate 15 through the current lead and is covered by a cap 22. The connecting ends 23 and 24 of the thermo element are introduced in a vacuum-tight manner. The current lead is screened by two metallic protecting caps 25 and 26, which are spaced at such a short distance from the current lead and from one another that no glow discharge will take place in the intervening spaces. The parts 27 and 28 are two insulating members and the part 29 is a sealing ring, for instance of rubber. The metal ring 30 serves for tightening the seal.

The anode 32 is secured to the lead-in conductor 31. This lead-in conductor is also hollow and adapted to be cooled in its interior. The pipe 33 serves to supply a cooling medium to the interior of the conductor 31 which is discharged through the pipe connection 34.

The part 35 is a metallic screen of the lead-in conductor, which is arranged at such a short distance from the outer surface of the conductor that no glow discharge will take place in the intervening space. The part 36 is an insulating ring and the part 37 is an insulating and tightening ring, while the parts 38 and 39 are sealing rings.

The source of current 40, which may be a source of direct or of alternating current, is connected, for instance, with its negative pole over an adjustable resistance 41, and the switches 42, 43, 44 to the lead-in conductors for the hard metal bodies to be sintered. The positive pole of the source of direct current may be connected to the anode 32 over a switch 45, but it may also be conductively connected over a switch 46 to the upper part of the sintering oven. In the latter case the casing of the oven serves as anode.

What we claim is:

1. A method of manufacturing relatively hard metal articles from metal powder which comprises, pressing the metal powder into the desired article shape, supporting the shaped metal powder in a sealed housing, evacuating the housing to remove gases from the pressed metal powder, introducing an inactive gas into the housing, and thereafter creating a negative glow discharge within the housing to surround the shaped metal powder to sinter the pressed metal powder.

2. A method of manufacturing relatively hard metal articles from metal powder which comprises, pressing the metal powder into the desired article shape, supporting the shaped metal powder within and insulated with respect to a sealed housing, evacuating the housing to remove gases from the pressed metal powder, introducing an inactive gas into the housing, and impressing a voltage across the articles and the housing to create a negative glow discharge around the pressed powder to sinter the articles.

3. A method of manufacturing relatively hard metal articles from metal powder which comprises, pressing the metal powder into the desired article shape, supporting the shaped metal powder within and insulated with respect to a sealed housing, evacuating the housing to remove gases from the pressed metal powder, passing an inactive gas through the housing, and impressing a voltage across the articles and the housing to create a glow discharge around the pressed powder to sinter the articles whereby gases released by the heated articles are removed by the passing inactive gas to provide further degasification of the metal powder.

4. A method of manufacturing relatively hard metal articles from metal powder which comprises, pressing the metal powder into the desired article shape, supporting the shaped metal powder within and insulated with respect to a sealed housing, evacuating the housing to remove gases from the pressed metal powder, introducing an inactive gas into the housing, impressing a voltage across the articles and the housing to creat a negative glow discharge around the pressed powder to sinter the articles, and cooling the housing so that the sintering temperatures of the article will be entirely dependent upon the glow discharge.

5. A method of manufacturing relatively hard metal articles from metal powder which comprises, pressing the metal powder into the desired article shape, supporting the shaped metal powder within and insulated with respect to a sealed metal housing, evacuating the housing to remove gases from the pressed metal powder, introducing an inactive gas into the housing, impressing a given voltage across the article and the housing to create a negative glow discharge around the article so as to partly sinter the pressed metal powder, and thereafter increasing the voltage impressed across the housing and the article to more completely sinter the metal powder.

BERNHARD BERGHAUS.
WILHELM BURKHARDT.